United States Patent [19]
Okada et al.
[11] 4,057,655
[45] Nov. 8, 1977

[54] PROCESS FOR PREPARING A LACTULOSE-CONTAINING POWDER FOR FEED

[75] Inventors: Katsuto Okada, Tokyo; Katsuhiro Ogasa; Mamoru Tomita, both of Yokohama, all of Japan

[73] Assignee: Morinaga Milk Industry Co., Ltd., Tokyo, Japan

[21] Appl. No.: 702,680

[22] Filed: July 6, 1976

[30] Foreign Application Priority Data

| | | |
|---|---|---|
| July 4, 1975 | Japan | 50-81936 |
| July 8, 1975 | Japan | 50-83188 |

[51] Int. Cl.[2] .................... A23K 1/08
[52] U.S. Cl. .................... 426/583; 426/658; 426/807
[58] Field of Search .................... 426/2, 41, 580, 658, 426/583, 805, 807; 127/34, 42; 195/31 R

[56] References Cited

U.S. PATENT DOCUMENTS

| | | | |
|---|---|---|---|
| 2,811,450 | 10/1957 | Petuely | 195/31 R |
| 3,546,206 | 12/1970 | Guth et al. | 127/42 |

*Primary Examiner*—R. B. Penland
*Attorney, Agent, or Firm*—Oblon, Fisher, Spivak, McClelland & Maier

[57] ABSTRACT

A process for preparing a free-flowing lactulose-containing powder from a solution containing lactose, by adding calcium hydroxide to the solution to adjust the pH of said solution to from 9.4 to 11.2; heating the resulting solution so that the pH is reduced to from 7.5 to 9.0; the homogenizing, concentrating and drying.

2 Claims, No Drawings

PROCESS FOR PREPARING A LACTULOSE-CONTAINING POWDER FOR FEED

BACKGROUND OF THE INVENTION

1. Field of the Invention

The present invention relates to a process for preparing a lactulose-containing powder for feed. More particularly, the present invention relates to a process for preparing a free-flowable lactulose-containing powder of high concentration for feed at a moderate price from cheese whey or casein whey which is a byproduct of dairy plants, or partially delactosed whey, or a permeate obtained by ultrafiltration of whey or skim milk to recover protein. More specifically, it relates to a process for preparing a free-flowing lactulose-containing powder for feed containing about 6.0 to 25% of lactulose at a low cost. This is accomplished by adding a specific amount of calcium hydroxide to a lactose-containing solution, heating the resulting mixed solution under specific conditions to cause the isomerization reaction of lactose and homogenizing, concentrating and drying the resulting lactulose-containing solution as it is.

DESCRIPTION OF THE PRIOR ART

It is well known that lactulose is a bifidus factor and exerts a favorable effect on intestines when administered to infants and nurslings. It has been reported that, when lactulose of high purity is added to the artificial feed administered to a calf, bifidus flora becomes predominant in the intestines of calf (B. Gedek: Zentralblatt fur Bakterialogie, Parasitenkunde, Infektionskrankheiten und Hygiene: Abt. 1, Originale, vol. 209, No. 2, 244~261, 1969).

However, lactulose of high purity is very expensive so that it has hitherto been used only as a medicine. Thus, a powdery feed containing a significant amount of lactulose of high purity is extremely expensive. As is well known, lactulose of high purity is prepared by adding an alkali agent to an aqueous solution of purified lactose and heating the solution to isomerize the lactose. However, lactose used as a raw material for preparation of lactulose is of U.S.P. Grade, Edible Grade, Technical Grade or Commercial Grade. Lactulose prepared from such lactose is too expensive to be utilized as a feed.

Furthermore, in the isomerization reaction of lactose, since the lactose solution is lacking in buffering action, lactulose produced therefrom is easily decomposed to galactose and fructose and the latter is further decomposed to saccharic acid which lowers pH of the reaction solution rapidly to below 7.0. Therefore, it is difficult to elevate the production rate of lactulose (for lactose) and maintain the pH in the alkali region of 7.0~9.0 in an aqueous solution of lactose. In addition, in the concentration and drying of the reaction solution, the viscosity of the solution increases and solid matter adheres on the heating walls of dryer so that it is very difficult to dry the solution in an ordinary dryer. Even if it could be dried, the powder obtained is so hygroscopic that it is easily agglomerated and caked with time and finally becomes very viscid. Therefore, a lactulose powder of high purity is not only difficult to dry but also to handle and, thus, it is technically difficult to mix such lactulose powder with other nutritive materials to prepare a lactulose-containing feed. For the reason as described above, up to the present a free-flowing additive for feed containing lactulose in high concentration which can be provided at a moderate price has not been manufactured and sold.

SUMMARY OF THE INVENTION

An object of the present invention is to provide a process for preparing a free-flowing lactulose-containing powder for feed which is high in lactulose content and is not agglomerated and caked, at a low cost.

As a result of research, the present inventors have found that a lactulose-containing additive for feed can be prepared by utilizing the lactose containing byproduct of dairy plants which has hitherto been dumped or of lower utility value, that is, whey or partially delactosed whey, or a filtrate obtained by ultrafiltration of whey or skim milk for recovering protein therefrom, and have attained the object according to the present invention.

The process of the present invention is a process for preparing a free-flowing lactulose-containing additive powder for feed of about 6 to 25% in lactulose content comprises adding calcium hydroxide to the above mentioned byproduct solution or filtrate to adjust its pH to 9.4 to 11.2, heating the resulting mixed solution so that the pH becomes 7.5 to 9.0, homogenizing, concentrating and drying it.

DETAILED DESCRIPTION OF THE PREFERRED EMBODIMENT

The raw material used in the present invention is a byproduct solution from dairy plants predominantly containing lactose. The byproduct solution includes cheese whey, casein whey, or a whey solution obtained by concentrating these wheys to partially separate lactose therefrom or a permeate obtained by filtering these wheys or skim milk to separate and recover protein. These solutions are not sufficiently utilized but some of them have been discarded and so any measure to counter public harm thereby is now needed. The whey solution includes cheese whey, rennet casein whey, acid casein whey, quarque whey, and the like. The total solid content of whey is about 6.0 to 6.4% and about 70% of solid content is lactose. These wheys used in the present invention are preferably concentrated to 25 to 50%, particularly, 30 to 40% in total solid content. The composition and pH of ultrafiltrate of skim milk and whey are, for example as shown in Table 1.

Table 1

| | Ultrafiltrate of skim milk | Ultrafiltrate of whey |
|---|---|---|
| Total solid, % by weight | 5.4 | 5.2 |
| Lactose | 4.5 | 4.3 |
| Total nitrogen | 0.1 | 0.1 |
| (Non-proteinous nitrogen) | (0.01) | (0.02) |
| Ash | 0.5 | 0.5 |
| Citrate, lactate and others | 0.3 | 0.3 |
| pH | 6.6 | 6.5 |

As is evident from the Table, the both filtrates are about 5% in total solid content. They are preferably concentrated as dense as possible for use. However, since concentration to over 21% solid content causes scale formation on the heating surface of concentrator making further concentration difficult, therefor, the filtrates are desirably concentrated to a concentration degree below 21%.

The alkali agent used for the isomerization reaction of lactose in the present invention is calcium hydroxide. It is added to the raw material solution, i.e. whey or ultrafiltrate described above, in the form of a powder or aqueous suspension of 1 to 20%. In case of using calcium hydroxide, a lactulose-containing powder for feed having a lactulose content of 6 to 25% can be prepared, though it varies with the lactose content in raw material solution processed. A feature of using calcium hydroxide specifically as the isomerizing agent resides in the flowability of powdered product obtained. Due to the use of calcium hydroxide as the isomerizing agent, more than 90% of the phosphoric acid, citric acid and lactic acid in the raw material solution can be precipitated as an insoluble calcium salt and almost all proteins in the raw material solution can be easily heat-coagulated. Since the proteins so coagulated can be homogenized, the powder obtained can be made free-flowing. Another effect of using calcium hydroxide as isomerizing agent is that the suspension-containing insoluble calcium salts produced, described above, and the heat-coagulated protein may be concentrated to a higher solid content because the viscosity of the suspension decreases significantly upon homogenization, thereby the drying cost can be reduced and also the manufacturing cost of the feed is reduced. Also the concentrated solution can be easily dried without difficulty since the formation of the above mentioned calcium salt has the effect of decreasing the adhesion of powder onto the interior wall of dryer. The use of calcium hydroxide as the isomerizing agent produces a feed predominantly containing calcium which is indispensable for the growth of animals.

The process of the present invention will be explained in detail in order of step as follows:

1. Addition of calcium hydroxide

In the present invention pH of the whey or filtrate is adjusted within a specific range by adding calcium hydroxide thereto. The adjustment of pH has a close relationship with the subsequent heating step.

The amount of calcium hydroxide added to the raw material solution was determined according to the following test:

TEST 1

Gauda cheese whey powder from Norway (fat 1%, lactose 76%, protein 13%, ash 7.5% and water content 2.5%) was dissolved in warm water to prepare 200Kg of raw material solution having a solid content of 30% and a pH of 5.85 in pH. Each 10Kg of the raw material solution was taken into 10 butts made of stainless steel and heated to 90° C on a water bath and then 15g, 30g, 40g, 45g, 60g, 75g, 90g, 120g, 150g and 180g of calcium hydroxide powder were added to each butt and, after being maintained at this temperature for 20 minutes, cooled to 50° C. The pH and lactulose and galactose contents of each mixed solution were measured to give a relation of the amount of calcium hydroxide added with the production rate of lactulose. The pH was, after stirred for 5 minutes, measured by a pH meter (Type M-7, made by Horiba Seisakusho), the lactulose and galactose contents were measured by the gas chromatography method of Sweeley et al (Journal of the American Chemical Society, 85, 2497, 1963) and the production rates of lactulose and galactose were calculated as a percentage for total lactose content in the raw material solution.

Table 2

| Amount of calcium hydroxide added | 15g | 30g | 40g | 45g | 60g | 75g | 90g | 105g | 120g | 150g | 180g |
|---|---|---|---|---|---|---|---|---|---|---|---|
| pH of mixed solution before heating | 6.30 | 7.60 | 9.00 | 9.40 | 10.20 | 10.70 | 10.95 | 11.10 | 11.20 | 11.30 | 11.35 |
| pH of mixed solution after heating | 6.00 | 6.75 | 7.10 | 7.50 | 8.12 | 8.00 | 8.50 | 8.51 | 8.53 | 8.58 | 8.60 |
| Production rate of lactulose (%) | 0.5 | 1.0 | 3.6 | 8.4 | 15.4 | 19.6 | 22.1 | 25.3 | 28.7 | 26.1 | 25.2 |
| Production rate of galactose (%) | 0.1 | 0.2 | 0.2 | 0.6 | 1.5 | 2.6 | 6.2 | 8.3 | 9.3 | 12.7 | 21.9 |

From Table 2 the following are evident:

a. When the amount of calcium hydroxide added is small and pH of the mixed solution heated is less than 9.4, the isomerization rate of lactose is so low that the production rate of lactulose is below 8% for lactose in the raw material solution;

b. When the pH of the heated mixed solution is over 11.2, even though the amount of calcium hydroxide added becomes large, the production of lactulose is not only limited, but also the lactulose produced is decomposed into galactose and fructose and the galactose content is radically increased while the production amount of lactulose is decreased; and c. When the pH is 9.4 to 11.2, lactulose is effectively produced with the production rate of lactulose being 8.4 to 28.7% and that of galactose being 0.6 to 9.3%.

As is evident from the above results, when calcium hydroxide is added to the raw material solution so that pH of the solution is adjusted within the range of 9.4 to 11.2 and thereafter the solution is heated, about 8.0 to 30.0% of lactose in the raw material solution is isomerized to lactulose. The same tests were repeated on chedder cheese whey, quark whey, acid casein whey and partially delactosed whey and the results were similar to those in Table 2. While calcium hydroxide is employed for the isomerization reaction of lactose, however, there are various kinds of whey different in composition and properties, and, therefore, some calcium hydroxide added is partially consumed for neutralization of acid and precipitation of protein and the like.

However, even considering these amounts of calcium hydroxide consumed, if it is added so that pH of the mixed solution is within the range of 9.4 to 11.2, the desired isomerization of lactose to lactulose can be carried out for whey of any lactose content.

2. Heating of the mixed solution

The mixed solution is heated batchwise or continuously at a temperature of 60° to 95° C under such conditions that the pH of the solution is 7.5 to 9.0 (at 40° C). The heating condition is determined by keeping the pH of the mixed solution at the time of finishing the heating within a specific range since the condition varies with pH of mixed solution, heating temperature and heating time. Due to this heating, most of nitrogen compounds and protein are agglomerated and simultaneously phosphoric acid, citric acid and lactic acid are precipitated as an insoluble calcium salt. However, these substances are suspended and dispersed in the mixed solution without precipitating by stirring the solution strongly.

The relations of the production rate of lactulose and heating temperature and heating time will be shown in Tests 2 and 3.

TEST 2

Each 6ml of mixed solution (solid content: 30%, calcium hydroxide added: 3%) prepared in the same manner as in Test 1 were charged into 20 glass tubes each 1 cm in diameter and 12 cm in length. One of them was used as a control which was not heated and remaining 19 each were immersed into a water bath adjusted to 90° C and heated for 1, 2, 3, 4, 5, 7, 10, 15, 25, 30, 40, 50, 60, 75, 90, 120, 180 and 240 minutes, respectively, and, immediately after taken out from the water bath, immersed into ice water to be rapidly cooled. Then, the pH and lactulose and galactose contents of each mixed solution were measured by the same method as in Test 1 to examine the relationship of heating time and the production rates of lactulose and galactose. The results are as shown in Table 3.

Table 3

| Heating time (minutes) | 0* | 1 | 2 | 3 | 4 | 5 | 6 | 7 | 10 | 15 | 20 |
|---|---|---|---|---|---|---|---|---|---|---|---|
| pH of mixed solution after heating (%) | 10.70 | 9.85 | 9.60 | 9.45 | 9.35 | 9.20 | 9.05 | 9.00 | 8.85 | 8.60 | 8.50 |
| Production rate of lactoluose (%) | 0 | 17.4 | 19.6 | 20.6 | 21.0 | 21.2 | 22.3 | 22.6 | 22.7 | 22.6 | 22.4 |
| Production rate of galactose (%) | 0 | 0.9 | 1.9 | 2.1 | 2.9 | 3.4 | 4.7 | 5.4 | 5.8 | 6.0 | 6.20 |

| Heating time (minutes) | 25 | 30 | 40 | 50 | 60 | 75 | 90 | 120 | 180 | 240 |
|---|---|---|---|---|---|---|---|---|---|---|
| pH of mixed solution after heating (%) | 8.35 | 8.25 | 8.00 | 7.75 | 7.50 | 7.30 | 7.10 | 6.80 | 6.10 | 5.60 |
| Production rate of lactulose (%) | 22.3 | 22.0 | 21.4 | 21.8 | 21.6 | 20.1 | 19.3 | 18.4 | 17.2 | 16.0 |
| Production rate of galactose (%) | 6.30 | 6.60 | 7.00 | 8.60 | 9.10 | 12.3 | 14.7 | 16.9 | 18.4 | 20.9 |

*not heated as a control

From Table 3 it is recognized that, in a sample heated so that pH of the mixed solution may become 9.0. the production rate of lactulose reaches almost the maximum, while, in another sample heated so as to obtain a pH less than 7.5 the amount of lactulose produced decreases rapidly. In, in samples heated so that pH of the mixed solution is within the range of from 9.0 to 7.5, the production rate of lactulose is a constant 21.4 to 22.7%. Thus, it is clear that, when heating the mixed solution for a long time, pH of the mixed solution lowers and that of, therefore, the production rate of lactulose is decreased and galactose is increased. Thus, heating the mixed solution for a long time is not preferable. Therefore, in order to maintain high lactulose content in the present invention, it is necessary to heat the mixed solution so that the pH may be within the range of 9.0 to 7.5.

Then, the present inventors held Test 3 to determine the relationship of heating temperature and heating time and pH of mixed solution.

TEST 3

A raw material solution of 30% in solid content was prepared using the same gauda cheese whey powder from Norway as in Test 1 in the same manner as in Test 1. Calcium hydroxide powder was added to the raw material solution at the rate of 90g (3% for solid content) of calcium hydroxide to 10Kg of raw material solution and the mixed solution was heated at the temperature and time described in Table 4. The pH of the mixed solution was measured in the same manner as in Test 1 (rectified to pH at 40° C) and the variation of pH of the mixed solution with the heating temperature and heating time was examined.

Table 4

| Heating temperature \ pH \ Time (minutes) | 0* | 5 | 10 | 20 | 30 | 40 | 60 | 90 | 120 | 180 | 240 |
|---|---|---|---|---|---|---|---|---|---|---|---|
| 60° C | 10.70 | 10.50 | 10.25 | 10.00 | 9.75 | 9.55 | 9.35 | 9.10 | 8.80 | 8.50 | 8.20 |
| 70° C | 10.70 | 9.90 | 9.65 | 9.25 | 9.00 | 8.80 | 8.60 | 8.20 | 8.10 | 7.65 | 7.30 |
| 80° C | 10.70 | 9.45 | 9.10 | 8.75 | 8.50 | 8.30 | 8.05 | 7.75 | 7.60 | 7.30 | 6.80 |
| 90° C | 10.70 | 9.20 | 8.85 | 8.50 | 8.25 | 8.00 | 7.50 | 7.30 | 7.10 | 6.80 | 6.50 |
| 95° C | 10.70 | 8.90 | 8.55 | 8.10 | 7.60 | 7.40 | 7.25 | 7.05 | 6.70 | 6.40 | 6.10 |

*not heated as a control

It will be understood from Table 4 that a relationship of heating temperature and heating time sufficient to keep pH of the mixed solution within the range of 7.5 to 9.0 is 120 to 240 minutes at 60° C, 30 to 180 minutes at 70° C, 20 to 120 minutes at 80° C, 10 to 60 minutes at 90° C and 5 to 30 minutes at 95° C. Therefore, the mixed solution is desirable heated at a temperature as high as possible to shorten the treating time although it may be heated under the above described condition.

The same pH adjustment and heating condition as described above can be applied to a filtrate obtained by ultrafiltration of whey or skim milk for recovering protein.

The pH adjustment and heating condition on a filtrate obtained by ultrafiltration of emmental cheese whey will be described in Test 4.

TEST 4

A filtrate (having the same composition as that of whey filtrate in Table 1) obtained by ultrafiltration of emmental cheese whey was concentrated to 19.7% in solid content by a plate type of concentrator (made by APV Co., England) to prepare about 20Kg of concentrated filtrate.

The composition was as follows:

| | |
|---|---|
| Lactose | 16.5%, by weight |
| Total nitrogen | 0.4%, by weight |
| Nitrogen in non-proteinous state | 0.1%, by weight |
| Ash content | 1.8%, by weight |
| Others | 1.0%, by weight |
| pH | 6.0 |

Each amount of calcium hydroxide as shown in Table 5 was added to the concentrated filtrate and kept at 80° C for 30 minutes while stirring, and thereafter cooled to 40° C rapidly and then pH, lactulose content and galactose content were measured to provide a relation of amount of calcium hydroxide added and production rate of lactulose. The results are as shown in Table 5.

Table 5

| Amount of calcium hydroxide added (g) | 0.25 | 0.30 | 0.40 | 0.50 | 0.75 | 1.00 | 1.25 | 1.50 | 1.75 | 2.00 | 3.00 |
|---|---|---|---|---|---|---|---|---|---|---|---|
| pH of mixed solution before heating | 6.85 | 7.20 | 8.10 | 9.40 | 10.60 | 10.80 | 11.00 | 11.10 | 11.20 | 11.30 | 11.50 |
| pH of mixed solution after heating | 6.60 | 6.95 | 7.30 | 8.70 | 8.90 | 9.00 | 9.00 | 9.00 | 9.00 | 9.10 | 9.10 |
| Production rate of lactulose (%) | 0.2 | 1.0 | 4.2 | 8.9 | 20.6 | 26.3 | 27.6 | 28.5 | 28.1 | 27.8 | 26.2 |
| Production rate of galactose (%) | 0 | 0.1 | 0.3 | 1.3 | 2.6 | 4.0 | 6.0 | 8.2 | 9.3 | 15.0 | 21.5 |

As is evident from Table 5, a sample in which the pH of the mixed solution before heating is less than 9.4, the production rate of lactulose is low, below about 8%, while, in a sample in which the pH is over 11.2, the production rate of lactulose is not increased but rather decreased and that of galactose is radically increased. Therefore, an addition of calcium hydroxide in such an amount that pH of the mixed solution is over 11.2 does not increase the production rate of lactulose but decreases it. Therefore, similarly it is necessary to add calcium hydroxide to whey permeate so that pH of the mixed solution before heating is adjusted within the range of 9.4 to 11.2, preferably 10.8 to 11.1.

The same test was held on a filtrate of skim milk and the same result as in Table 5 was obtained.

The mixed solution of whey permeate and calcium hydroxide is heated at a temperature of 70° to 130° C under such conditions that the pH of the mixed solution is from 7.5 to 9.0 (at 40° C). The permeate may be heated by a plate heater because the protein is removed therefrom, and, therefore, a higher temperature can be applied thereto in comparison with when whey is treated. Although the isomerization of lactose by heating varies with the pH of the mixed solution, the heating temperature and heating time, the heating must be held so that pH of mixed solution after heating is within the range of 7.5 to 9.0 (at 40° C).

Test 5

The same concentrated filtrate as used in Test 4 was prepared and the production rate of lactulose and pH of mixed solution were measured in the progress of time in the same manner as in Test 4. The results are as shown in Table 6.

Table 6

| Heating time (minutes) | 0* | 1 | 2 | 3 | 4 | 5 | 7 | 10 | 15 | 20 | 25 |
|---|---|---|---|---|---|---|---|---|---|---|---|
| pH of mixed solution after heating | 11.0 | 10.00 | 9.80 | 9.50 | 9.30 | 9.20 | 9.00 | 8.80 | 8.60 | 8.50 | 8.35 |
| Production rate of lactulose (%) | 0 | 12.3 | 16.4 | 20.1 | 26.3 | 26.9 | 28.3 | 28.5 | 28.4 | 28.7 | 28.5 |
| Production rate of galactose (%) | 0 | 1.2 | 1.9 | 2.4 | 4.0 | 5.3 | 6.2 | 7.4 | 8.1 | 9.4 | 11.0 |

| Heating time (minutes) | 30 | 40 | 50 | 60 | 75 | 90 | 120 | 180 | 240 |
|---|---|---|---|---|---|---|---|---|---|
| pH of mixed solution after heating | 8.15 | 7.95 | 7.80 | 7.65 | 7.50 | 7.40 | 7.20 | 7.00 | 6.80 |
| Production rate of lactulose (%) | 28.1 | 28.0 | 28.1 | 28.0 | 27.8 | 27.1 | 26.0 | 25.7 | 24.4 |
| Production rate of galactose (%) | 11.7 | 12.5 | 13.3 | 14.2 | 15.0 | 17.9 | 21.5 | 24.1 | 27.8 |

*not heated as a control

As is recognized from Table 6, a sample heated so that pH of the mixed solution may become 9.0, the production rate of lactulose reaches almost the highest, while, in another sample heated so that the pH may be less than 7.5, lactulose produced decreases. And in a sample heated so that pH of the mixed solution may be within the range of 7.5 to 9.0 the production rate of lactulose is constant at 27.8 to 28.7%. Also, as is evident from Table 6, pH of the mixed solution reduces gradually in the pH range of less than 9.0 although the pH immediately after heating drops remarkably. Being different from the drop of pH in case of heating a pure lactose solution added with alkali, this is due to a buffer action of mixed solution. The buffer action restrains the decomposition of lactulose to a certain degree even in a mixed solution of 7.5 to 9.0 in pH.

However, it is obvious from Table 6 that, if the mixed solution is heated for a long time, thus pH lowers and lactulose is decreased but galactose is increased. Thus, heating the mixed solution for a long time is not preferable.

In the permeate used in Test 4, in case the heating temperature is 70° C, it takes 30 minutes, 100 minutes and about 300 minutes (in a presumed value) for pH of the mixed solution of 9.0, 8.5 and 7.5, respectively. And in case of heating at 100° C the mixed solution reaches pH 9.0 in about 3 minutes, pH 8.5 in about 10 minutes and pH 7.5 in about 75 minutes. In case the heating temperature is 130° C, it takes about 0.2 minutes (presumed value), about 1 minute (presumed value) and 4 minutes for pH of the mixed solution of 9.0, 8.5 and 7.5, respectively. Thus, the higher the heating temperature is, the shorter the time in which pH of the mixed solution can reach the desired value is. (3) Homogenization and concentration of mixed solution Subsequently, the mixed solution so heated is homogenized. The homogenization is conducted within the range of 60° to 90° C in temperature and 20 to 60 $Kg/cm^2$ in homogenization pressure depending upon the concentration and pH of mixed solution and amount of calcium hydroxide added using the conventional homogenizer. The heated mixed solution contains a large amount of agglomerated precipitate suspended and dispersed therein, and the more the amount of calcium hydroxide added is and the higher the solid content of raw material solution is, the higher the viscosity of mixed solution after heating is. Due to the homogenization, these agglomerated precipitates are physically crushed and dispersed in a finely divided state in the mixed solution and thereby the viscosity is lowered. Since the viscosity of the mixed solution is lowered by the homogenizing treatment, in case the solid content of raw material solution used is low, it is possible to concentrate the raw material solution after homogenization treatment again to adjust the solid content to 55 to 60%. In case the mixed solution is not concentrating immediately after homogenization, it is cooled to below 65° C, desirably 40° to 50° C for preventing lactulose from decomposition.

When, in case of concentrating after homogenization, since the mixed solution can be concentrated to the desired solid content at a temperature below 70° C for 4 to 10 minutes by a continuous type of concentrator conventionally used in the milk industry field in the present time, it is possible to concentrate the mixed solution while maintaining the pH at from 7.5 to 9.0 using the concentrator. Also, since protein, citrate radical, phosphate radical and the like in the whey have a buffer action, lactulose in the mixed solution is not decomposed, even if it is concentrated at a temperature of below 70° C within the pH range of 7.5 to 9.0. Care must be taken to prevent the decomposition lactulose in the mixed solution when concentrating the mixed solution after homogenization. The method of adding butter milk powder, whey powder, skim milk powder and the like is particularly desirable for carrying out the process of the present invention, since such care is not required in this procedure.

4. Drying of mixed solution

The mixed solution thus obtained has a solid content of 55 to 60% and is dried in the alkaline state. The drying is carried out under the conventional condition for drying when by spray drying, drum drying and others. Usually cheese whey is concentrated to 50 to a solid content of 55% and, after crystallizing lactose previously, is spray dried centrifugally, however, in the present invention it can be spray dried without previous crystallization of lactose for the following reasons:

a. Lactose is high in β conversion and soluble in water so that it is not crystallized because the mixed solution before drying is maintained in pH of 7.5 to 9.0.

b. About 8 to 30% of lactose in the mixed solution is isomerized to lactulose which is not crystallized and, therefore, the absolute quantity of lactose which is easily crystallized decreases.

The mixed solution, which is higher in solid content than in case of common whey by 5 to 10% may be spray dried without any problem according to the conventional method because the viscosity of the mixed solution is remarkably lowered due to the homogenization after heating.

The powder thus obtained of high lactulose content can be mixed with other nutritive source to be used as a raw material for preparing a highly nutritive feed.

EXAMPLE 1

20Kg of raw material solution were prepared by dissolving gauda cheese whey powder from Norway the standard composition of which is shown in Table 7 in warm water at 50° C so as to be 30% in concentration.

Table 7

| Standard composition of whey powder | |
|---|---|
| Fat | 1.0% |
| Protein | 13.0% |
| Lactose | 76.0% |
| Ash content | 7.5% |
| Water content | 2.5% |

The raw material solution was added with 180g (equivalent to 3% of solid content in whey) of calcium hydroxide for food to adjust pH to 10.70. The mixed solution was heated at 80° C for 20 minutes to make the pH to 8.07, and immediately homogenized under homogenization condition of $50Kg/cm^2$ and 76° C by a homogenizer and cooled to 50° C. The homogenized mixed solution was 8.05 in pH and 9.0 c.p. (50° C) in viscosity. The homogenized mixed solution was concentrated to 56.2% in solid content using a plate type of concentrator according to the conventional method and dried by a centrifugal type of spray dryer according to the conventional method to obtain about 5g of powder. The concentrated mixed solution was 7.75 in pH and 84 c.p. (50° C) in viscosity and, therefore, the concentration and drying could be carried out almost in the same state as in usual skim milk without any problem.

The powder obtained was light brown and sweet in taste. The analysis result of the composition of powder was shown in Table 8.

Table 8

| Composition of powder | |
|---|---|
| Fat | 9.0% |
| Protein | 13.3% |
| Lactose | 53.7% |
| Lactulose | 16.8% |
| Galactose | 1.9% |
| Others* | 2.0% |
| Ash content | 9.3% |
| Water content | 2.1% |

*Contain carbohydrates as fructose, etc. and various sacchric acids produced by further decomposition of fructose.

Each about 2Kg of powder was put into a bag made of polyethylene of 0.7mm in thickness, sealed up and preserved at room temperature and in an incubator at 37° C, respectively, for two months. Caking of the powder was not recognized and the powder has good free-flowability like skim milk powder.

Feeds containing a lactulose-containing powder prepared according to Example 1 and a whey powder on the market, respectively, as a component were prepared and administered to 25 to 45-days-old young pigs for breeding test. Four one-month-old male pigs of 7.9Kg (No. 3), 8.5Kg (No. 1), 9.6Kg (No. 2) and 10.0Kg (No. 4) in weight which were farrowed from a female pig of Landrace were used as test animals. These pigs were divided into two groups of test group and control group. Each one pig was placed separately in a pigpen made of iron which is good in ventilation, lightening and heating, and was bred in a state that water can be freely drunk for thirty one days while administering two kinds of feed shown in Table 9 three times per day. And intake of feed was measured everyday and the total sam of intake during the breeding period and average intake per day were obtained. Each pig was measured its weight on the fifteenth and thirty first days after the start of test to compare weight increase, rate of weight increase, average weight increase per day and feed efficiency (weight increase per one Kg of feed intake). In addition, each pig was measured its intestinal bacteria flora on the fifteenth and thirty first days after the beginning of test by the following way.

A dung was taken from the rectum of pig with a sterilized spatula, which was placed into a liquid medium for transportation (Mitsuoka: Journal of Infection of Disease, 45, 408, 1971) and suspended. Each one ml of the suspension was mixed with 9ml of sterilized physiological salt solution, diluted according to the conventional method and incubated by the method of Mitsuoka (Journal of Bacteriology, Japan, 29, 775, 1974) to inspect the counts of bacteria flora. Incidentally, all young pigs before the test were administered with antibiotic-containing feed on the market.

The results are as shown in Tables 10 to 13.

The compositions of the feeds for the control group and the test group are given in Table 9. Weight gain and the rates of weight gain in test animals after the administration of feed, intake of feed and feed efficiency are shown in Table 10, 11 and 12 respectively. Table 13 shows the result of the determination of the counts of intestinal bacterial flora.

Table 9

| Component | Feed for control group | Feed for test group |
|---|---|---|
| Corn | 24.5 (%) | 24.5 (%) |
| Bran | 4.0 | 4.0 |
| Sugar | 5.0 | 5.0 |
| Defated rice bran | 6.0 | 6.0 |
| Barley | 13.4 | 13.4 |
| Defatted soy | 14.7 | 14.7 |
| Fish powder | 7.5 | 7.5 |
| Yeast for beer | 2.0 | 2.0 |
| Whey powder | 10 | — |
| The powder obtained by Example 1 | — | 10 |
| Wheat | 10 | 10 |
| Calcium carbonate | 0.4 | 0.4 |
| Calcium secondary phosphate | 0.9 | 0.9 |
| Salt | 0.5 | 0.5 |
| Minerals | 0.1 | 0.1 |
| Vitamins | 1.0 | 1.0 |

Table 10

| Group | Number of test | Item | After administering of feed 15th days | 31st days | average |
|---|---|---|---|---|---|
| Control group | No. 1 | Weight measured (Kg) | 13.1 | 18.2 | 15.65 |
| | | Weight gain (Kg) | 4.6 | 5.1 | 4.85 |
| | | Rate of weight gain (%) | 54.1 | 38.9 | 46.5 |
| | | Daily gain (Kg) | 0.31 | 0.34 | 0.33 |
| | No. 2 | Weight measured (Kg) | 14.1 | 19.5 | 16.80 |
| | | Weight gain (Kg) | 4.5 | 5.4 | 4.95 |
| | | Rate of weight gain (%) | 46.9 | 38.3 | 42.6 |
| | | Daily measured (Kg) | 0.30 | 0.36 | 0.33 |
| Test group | No. 3 | Weight measured (Kg) | 13.3 | 19.3 | 16.3 |
| | | Weight gain (Kg) | 5.4 | 6.0 | 5.70 |
| | | Rate of weight gain (%) | 68.4 | 45.1 | 56.8 |
| | | Daily measured (Kg) | 0.36 | 0.40 | 0.38 |
| | No. 4 | Weight measured (Kg) | 15.6 | 21.9 | 18.75 |
| | | Weight gain (Kg) | 5.6 | 6.3 | 5.95 |
| | | Rate of weight gain (%) | 56.0 | 40.4 | 48.2 |
| | | Daily measured (Kg) | 0.37 | 0.42 | 0.40 |

Table 11

| Group | Number of test | Average intake of feed 0~15 days | 16~31 days | Total intake of feed |
|---|---|---|---|---|
| Control group | No. 1 | 0.86 (kg/day) | 0.92 (kg/day) | 26.7 (Kg) |
| | No. 2 | 0.83 | 0.96 | 26.9 |
| Test group | No. 3 | 0.88 | 0.97 | 27.8 |
| | No. 4 | 0.93 | 1.04 | 29.6 |

Table 12

| Group | Number of test | Feed efficiency |
|---|---|---|
| Control group | No. 1 | 0.36 |
| | No. 2 | 0.37 |
| Test group | No. 3 | 0.41 |
| | No. 4 | 0.40 |

Table 13

| Group | No. of test | Item | Before test | After test 15th days | After test 31st days |
|---|---|---|---|---|---|
| Control group | No. 1 | Total counts of anaerobic bacterium | $1.5 \times 10^6$ | $1.5 \times 10^6$ | $1.8 \times 10^{10}$ |
| | | Bifidobacterium | $<10^6(0)$ | $3.4 \times 10^7$ | $2.0 \times 10^7$ |
| | | Lactobacillus | $9.6 \times 10^9$ | $5.0 \times 10^9$ | $1.2 \times 10^{10}$ |
| | | Entero-bacteriaceae | $2.2 \times 10^7$ | $9.3 \times 10^6$ | $6.3 \times 10^5$ |
| | | pH | 7.0 | 7.0 | 6.8 |
| | No. 2 | Total counts of anaerobic bacterium | $2.3 \times 10^6$ | $2.1 \times 10^{10}$ | $1.6 \times 10^{10}$ |
| | | Bifidobacterium | $<10^6$ | $2.4 \times 10^6$ | $3.0 \times 10^7$ |
| | | Lactobacillus | $8.7 \times 10^9$ | $4.0 \times 10^9$ | $9.2 \times 10^9$ |
| | | Entero-bacteriaceae | $2.4 \times 10^7$ | $8.1 \times 10^6$ | $7.2 \times 10^6$ |
| | | pH | 7.0 | 6.8 | 6.8 |
| Test group | No. 3 | Total counts of anaerobic bacterium | $1.8 \times 10^6$ | $3.0 \times 10^9$ | $3.1 \times 10^{10}$ |
| | | Bifidobacterium | $<10^6(0)$ | $2.2 \times 10^9$ | $9.0 \times 10^9$ |
| | | Lactobacillus | $4.3 \times 10^9$ | $2.7 \times 10^9$ | $3.6 \times 10^{10}$ |
| | | Entero-bacteriaceae | $5.5 \times 10^6$ | $<10^3(0)$ | $1.0 \times 10^4$ |
| | | pH | 7.0 | 6.6 | 6.4 |
| | No. 4 | Total counts of anaerobic bacterium | $2.1 \times 10^6$ | $2.4 \times 10^{10}$ | $2.0 \times 10^{10}$ |
| | | Bifidobacterium | $<10^6(0)$ | $3.4 \times 10^9$ | $2.0 \times 10^{10}$ |
| | | Lactobacillus | $5.1 \times 10^9$ | $3.1 \times 10^9$ | $8.4 \times 10^9$ |
| | | Entero-bacteriaceae | $6.1 \times 10^6$ | $<10^3$ | $<10^3$ |
| | | pH | 7.0 | 6.4 | 6.6 |

As is evident from the Tables, the young pigs of the test group administered with a feed added with lactulose-containing powder of the present invention were superior to those of the control group bred with a feed added with whey powder in rate of weight increase and feed efficiency, and the test group was better in intake of feed to show that the feed added with lactulose-containing powder has good taste. In addition, the inspection of intestinal bacterial flora shows the predominance of Bifidobacterium and reduction of Enterobacteriaceae. Thus, the lactulose-containing powder for feed according to the present invention has proved to be effective for the improvement of weight increase and intestinal bacterial flora and significantly useful as a feed aditive.

EXAMPLE 2

Whey filtrate (composition is shown in Table 1) obtained by filtrating 500Kg of emmental cheese whey by an ultrafiltration apparatus made by D.D.S. Co., Denmark was concentrated to 19.4% in solid content using a plate type of concentrator according to the conventional method. 20Kg of the concentrated filtrate were taken in a balance tank and were added and mixed with 150g of calcium hydroxide powder for food to adjust pH of mixed solution to 11.0 (at 40° C). The mixed solution was heated batchwise at 90° C for 20 minutes and rapidly cooled to 60° C, and homogenized under homogenization condition of 30Kg/cm$^2$ and 60° C by a homogenizer. The mixed solution after homogenized was 8.30 in pH and 27.2 c.p. (50° C) in viscosity. The homogenized mixed solution was further concentrated to 55.4% in solid content at a temperature of below 65° C without any hindrance by the above described concentrator. The mixed solution concentrated was 7.85 in pH and 94 c.p. (40° C) in viscosity. Immediately after concentration, the mixed solution was dried by a centrifugal type of spray dryer according to the conventional method to obtain about 3.6Kg of powder without any problem.

The analysis result of the general composition of powder was as shown in Table 14.

Table 14

| General composition of powder (%) | |
|---|---|
| Lactose | 44.6 |
| Lactulose | 23.4 |
| Galactose | 10.8 |
| Others* | 7.1 |
| Total nitrogen | 2.1 |
| Nitrogen in non-protein state | 0.4 |
| Ash content | 9.6 |
| Water content | 2.4 |

*Containg carbohydrates as fructose, etc., various sacchric acids produced by further decomposition of fructose, citric acid and lactic acid and others.

The powder obtained is a free-flowable powder of good quality which is light brown in color and sweet in taste. Each about 500g of powder was put into a bag made of polyethylene of 0.8mm in thickness, sealed up and preserved at room temperature and in an incubator at 37° C, respectively, for two months. The powder was not recognized any caking and had good free-flowability like skim milk powder.

EXAMPLE 3

The permeate (composition is shown in Table 1) obtained by filtrating 500g of fresh skim milk by the same ultrafiltration apparatus as in Example 2 was concentrated in the same manner as in Example 2 to obtain 201 of concentrated filtrate of 19.1% in solid content and 6.2 in pH.

On the other hand warm water at 60° C was added to 125g of calcium hydroxide for food to 2,500ml to prepare a suspension of about 5% in concentration. 1,200ml of the filtrate were placed into an overflowing type of small balance tank (overflow with 2l of volume) (1) provided with a heater and stirrer and heated to 90° C. 150ml of calcium hydroxide suspension were added thereto while stirring, and, after heating at 90° C for 10 minutes, the filtrate and calcium hydroxide suspension were continuously poured into the balance tank at the rate of 200ml/minutes and 25ml/minutes, respectively and heated at 90° C while stirring vigorously. After about 2 minutes and 55 seconds overflowing started, subsequently the heated mixed solution was overflowed at the rate of about 225ml/minutes and the overflowing ended in about 95 minutes. The mixed solution overflowed was introduced into another balance tank (2), cooled to 50° C and stored therein. About 5 minutes after the overflowing is finished the total amount of mixed solution in the balance tank (1) was transferred into the balance tank (2) and cooled to 50° C. The above described concentrated filtrate and calcium hydroxide suspension were partially taken into a beaker at the same mixing rate. pH of the resulting mixed solution was 10.95. The average retention time of filtrate in the balance tank (1) was about 9 minutes. The mixed solution after heating was 9.00 in pH, 1.41 c.p. (50° C) in viscosity and 18.1% in solid content. This mixed solution was homogenized in the same manner as in Example 2. The mixed solution after homogenization was 29.4 c.p. (50° C) in viscosity. About 20Kg of this mixed solution homogenized were concentrated to 50.5% in solid content in the same manner as in Example 2. The concentrated mixed solution was 8.40 in pH and 72 c.p. (50° C) in viscosity. Then, the mixed solution was dried in the same manner as in Example 2 to obtain about 3.6Kg of powder which was light brown, free-flowable and sweet in taste and further was not recognized any caking even in the same preservation test as in Example 1.

The composition of the powder according to analysis was as shown in Table 15.

Table 15

| Composition of powder (%) | |
|---|---|
| Lactose | 50.5 |
| Lactulose | 22.5 |
| Galactose | 4.9 |
| Others* | 7.2 |
| Total nitrogen | 2.4 |
| Nitrogen in non-protein state | 0.2 |
| Ash content | 10.4 |
| Water content | 2.4 |

*Contain carbohydrates as fructose, etc., various saccharic acids produced by further decomposition of fructose, citric acid and lactic acid and others.

What is claimed is:

1. A process for preparing a free-flowing lactulose-containing powder from a dairy plant waste liquor containing lactose which waste liquor is selected from the group consisting of cheese whey solutions, casein whey solutions, quarque whey solutions, partially delactosed whey solutions and permeates obtained by the ultrafiltration of whey solutions or skim milk, which comprises adding calcium hydroxide to said solution to adjust the pH of said solution to a value within the range of 9.4 to 11.2, heating the resulting solution at a temperature of from about 60° to 130° C for a time sufficient to reduce the pH to a value within the range of from 7.5 to 9.0; then homogenizing, concentrating and drying.

2. A free flowing lactulose containing powder prepared by the process which comprises adding calcium hydroxide to a dairy product waste liquor containing lactulose selected from the group consisting of cheese whey solutions, casein whey solutions, quarque whey solutions, partially delactosed whey solutions, and permeates obtained by the ultrafiltration of whey or skim milk, to adjust the pH of said solution to a value within the range of from 9.4 to 11.2, heating the resulting solution at a temperature of from 60° to 112° C for a time sufficient to reduce the pH to a value within the range of from 7.5 to 9.0; homogenizing, concentrating and drying.

* * * * *